Dec. 22, 1925.

R. S. JOHNSON

OVEN SIGNAL

Filed Aug. 18, 1925

Inventor
R.S.JOHNSON
By
Attorney

Dec. 22, 1925.　　　　　　　　　　　　　　　　1,566,751
R. S. JOHNSON
OVEN SIGNAL
Filed Aug. 18, 1925　　　2 Sheets-Sheet 2
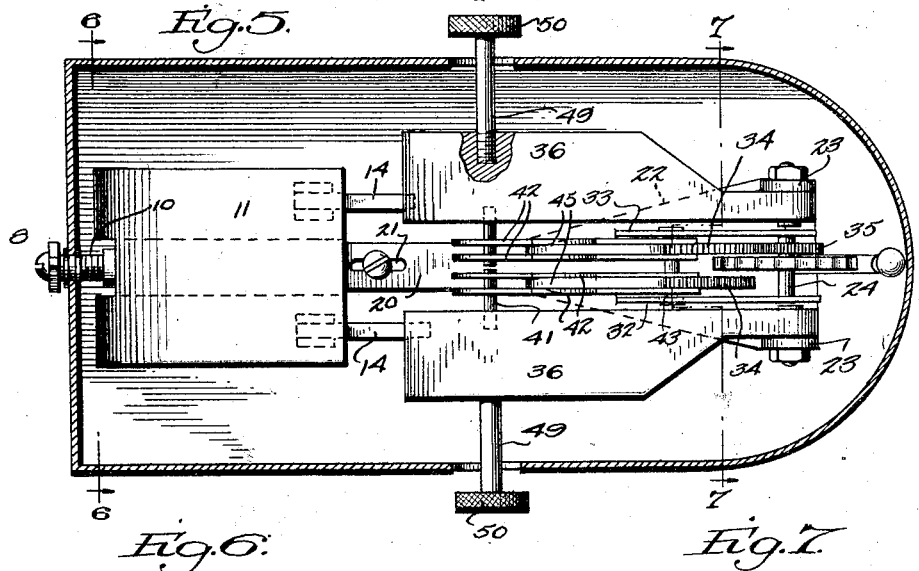
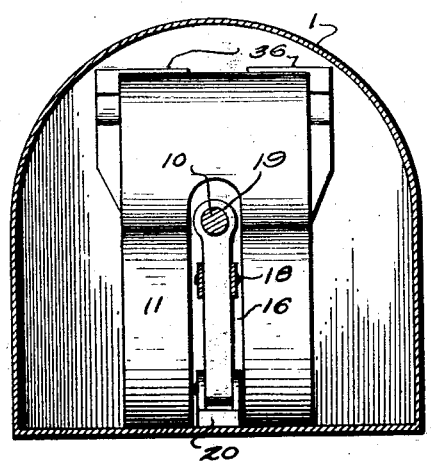 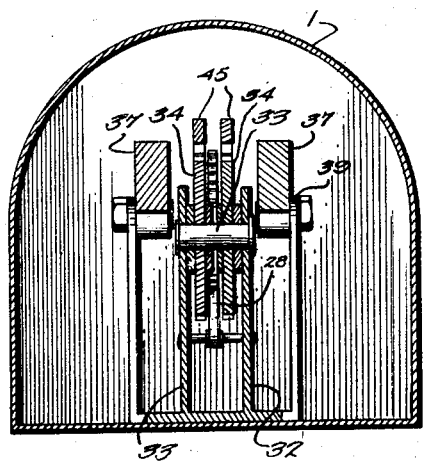
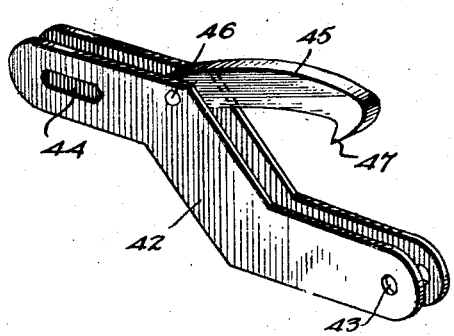
Inventor
R. S. JOHNSON
Attorney Patented Dec. 22, 1925.

1,566,751

UNITED STATES PATENT OFFICE.

RICHARD S. JOHNSON, OF YORK, PENNSYLVANIA.

OVEN SIGNAL.

Application filed August 18, 1925. Serial No. 51,057.

*To all whom it may concern:*

Be it known that I, RICHARD S. JOHNSON, a citizen of the United States, residing at York, in the county of York and State of Pennsylvania, have invented certain new and useful Improvements in Oven Signals, of which the following is a specification.

This invention relates to signals, and more particularly to an alarm for ovens and the like.

An object of the invention is to provide an apparatus of this character that may be set at the proper temperature for cooking a certain food and which will give a signal when this temperature is reached.

A further object of the invention is the provision of means for giving a further signal if the temperature is raised a predetermined amount above the temperature for which the oven is originally set.

A further object of the invention is the provision of a thermostatically controlled apparatus of this character which is simple in construction and by means of which the above results may be obtained.

In the accompanying drawings, I have shown one embodiment of the invention. In this showing:

Figure 1:
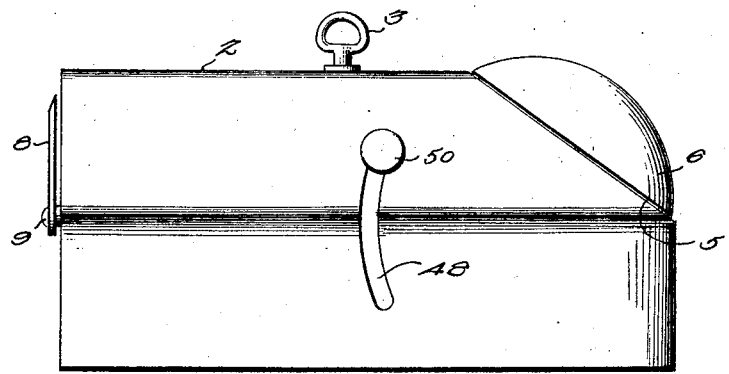
Figure 1 is a side elevation.
Figure 2:
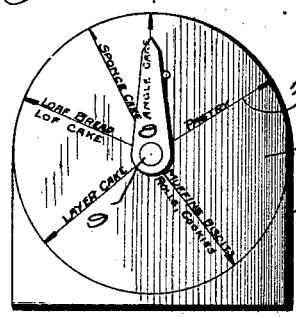
Figure 2 is a front elevation.
Figure 4:
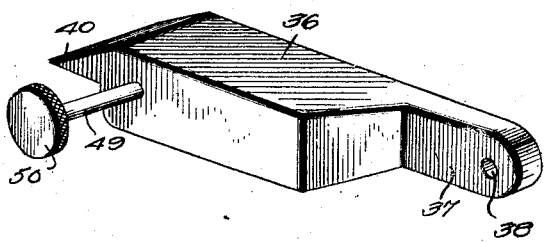
Figure 3:
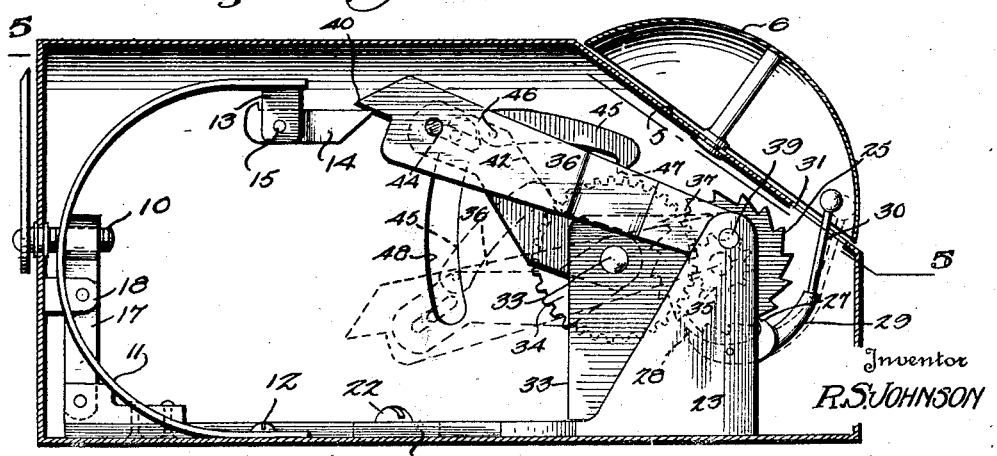
Figure 3 is a vertical sectional view substantially on line 3—3 of Figure 2.

Figure 4 is a perspective view of one of the weights by means of which the signal apparatus is actuated, Figure 5 is a horizontal sectional view on line 5—5 of Figure 3, Figure 6 is a vertical sectional view on line 6—6 of Figure 5, Figure 7 is a similar view on line 7—7 of Figure 5, and, Figure 8 is a perspective view of an actuating dog.

Referring to the drawings, the reference numeral 1 designates generally an outer casing which may be of any desired shape, and which, as shown, is provided with a curved or circular top 2. A handle 3 is secured to the top of the casing to permit the device to be moved from place to place. The casing is provided with a front wall 4 and is further provided with a sloping rear wall 5 upon which a bell 6 may be arranged.

As shown, the front wall of the casing is provided with suitable indicia 7 forming a dial and a pointer 8 is adapted to cooperate with the dial in setting the apparatus for cooking various foods. This pointer is mounted on a shaft or pin 9, journaled in the front wall of the casing and having a threaded portion 10 arranged within the casing.

A thermostat 11 is arranged within the casing and, as shown, the thermostat is secured to the bottom of the casing, as at 12, and bowed. The free end of the thermostatic element is provided with a pair of ears 13 adapted to receive a catch 14 mounted on a pin 15. As shown (see Figure 5), the thermostatic element is of an appreciable width and is adapted to support a pair of catches 14. The thermostatic element is provided with a centrally disposed slot 16 adapted to receive a pivoted lever 17 which is pivotally mounted in a bracket 18, secured to the inner side of the front wall and the upper end of this lever is provided with a threaded sleeve portion 19 adapted to receive the threaded portion 10 of the pin 9. The lower end of this lever is connected to a frame 20 which extends rearwardly and is provided with a slot 21 for the reception of a pin 22 which is anchored in the bottom wall of the casing and forms a guide for the frame. The frame 20 is adapted to support the mechanism by means of which the bell or signal is actuated. As shown, the rear portion thereof is of greater width than the front portion, the frame being provided with diverging side walls 22. Arranged adjacent the rear of these side walls and at each side of the frame, I provide vertical walls 23 adapted to receive and support a shaft 24. A ratchet wheel 25 is mounted on this shaft and is adapted to actuate a pawl 26 having a holding tooth 27 at one end and a tooth 28 at the opposite end adapted to be engaged by the teeth of the ratchet wheel when the ratchet wheel revolves in a clockwise direction to vibrate the pawl. As shown, the pawl is provided with an extension 29 to which a clapper 30 is secured and this clapper extends through a slot 31 in the sloping wall of the casing and is received within the bell 6.

Forwardly of the walls 23, I provide a pair of vertical walls 32 which are spaced from each other a less distance than the rear walls (see Figure 7). A shaft 33 is mounted in these walls and a pair of pinions 34 are carried by this shaft. One of the pinions meshes with a pinion 35 carried by the shaft 24 of the ratchet wheel.

On each side of the apparatus, I provide a weight 36 having a reduced rear portion 37 and this reduced rear portion is provided with an opening 38 for the reception of a pivot pin 39 mounted in the corresponding rear wall 23. Adjacent its forward end, the weight is reduced to provide a tooth 40 adapted to be engaged by the catch 14. Each of the weights is provided with a laterally projecting pin 41 on its inner side and these pins are adapted to receive an actuating lever 42, shown in Figure 8 of the drawings. As shown, the actuating lever is formed of a pair of plates extending on opposite sides of the gear 34 and having openings 43 therein for the reception of the shaft 33. Adjacent the opposite end, each of these plates is provided with an elongated slot 44 for the reception of the pin 41. Each of these levers is thus pivotally mounted on the shaft 33 and is controlled by a weight, the lever being lowered to the dotted line position shown in Figure 3 of the drawings, when the weight falls. Between the two plates of the lever, I provide an actuating dog 45, which is retained in position by means of a pin 44, and which is provided with a tooth 47 at its opposite end, adapted to engage the gear 34 when the lever is lowered. An arcuate slot 48 is provided on each side of the casing, and an actuating rod 49 projects through each of these slots and is provided with a suitable handle 50. As shown, (see Figure 5), the slot is of greater width than the rod to permit longitudinal adjustment of the rod when the frame is adjusted by means of the pointer.

The operation of the device is as follows:

The apparatus is adapted to be arranged on top of the oven to be heated by radiation therefrom, or under some circumstances, may be arranged within a chamber to be heated. The pointer 8 is set on the dial for the particular food to be cooked. In setting the pointer, the pin 9 is rotated, causing the sleeve 19 to move, thus swinging the lever 17 on its pivot and adjusting the frame 20 longitudinally of the casing. This adjustment of the frame controls the lap of the tooth 40 carried by the weight and the catch 14. The pin 22, riding in the elongated slot 21 forms a guide for the frame. The width of the slot 49 is sufficient to permit the frame to be adjusted any desired amount. When the dial is set, the weights are lifted by means of the handles 50 to the full line position shown in Figure 3 of the drawings. As the heat of the oven raises, the thermostat expands and tends to straighten out, the upper end thus raising toward the top of the casing and releasing the weight 36. The weight then swings downwardly on its pivot 39 carrying the actuating lever with it and as the actuating lever moves downwardly, the tooth 47 engages between a pair of teeth of the gear 34 revolving the gear, and thus revolving the shaft 33. The pinion 35 on the shaft 24 is then revolved, revolving the ratchet wheel in a clockwise direction and causing the tooth 28 to ride over the teeth of the ratchet wheel to vibrate the clapper 30, as indicated in dotted lines in Figure 3 of the drawings, and thus give a signal.

As shown in Figure 5 of the drawings, one of the catches 14 is slightly longer than the other and for any given adjustment of the pointer, this catch overlaps the tooth 40 a greater distance than the other catch. The weight at the top of Figure 5 of the drawings will thus be released first and the food to be cooked is then placed in the oven. It is then desirable to maintain a constant heat in the oven and if a certain flow of gas has been employed for the purpose of heating the oven, less gas may be necessary for the purpose of maintaining this heat. The weight 36 at the bottom of Figure 5 of the drawings is adapted to be released when the heat raises a given amount over the amount of heat necessary for cooking the particular food to give a second signal and thus inform the operator that the oven is becoming too hot. The operation of the second signal is the same as heretofore described. While the gear 34 corresponding to this signal is not in mesh with the pinion 35, revolution of this gear revolves the shaft 33 and thus revolves the other pinion to actuate the shaft 24 and the ratchet wheel 25.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a thermostat having a weight supporting member associated therewith, a weight having a portion overhanging said weight supporting member to be supported thereon, a device adapted to be operated by movement of said weight, a frame carrying said weight, and means for adjusting said frame to vary the overhang of said weight on said supporting member.

2. In a device of the character described, a casing, a dial arranged on said casing, a pointer associated with said dial, a thermostat arranged in said casing, a weight supporting member carried by a portion of said thermostat, a weight arranged in said casing and having a lip overhanging said weight supporting member and resting thereon, an alarm adapted to be actuated by said weight, said weight supporting member being movable away from said weight with the portion of said thermostat by which it is carried as the latter moves under the influence of increasing temperatures, a frame mounted in said casing and carrying said weight, said frame being adjustable to move said weight toward and away from said weight supporting member to vary the overhang of said lip on said weight supporting member, and means connected between said pointer and said frame for adjusting the latter according to the position of said pointer.

3. A device constructed in accordance with claim 2 wherein said means includes a lever pivotally mounted intermediate its ends and connected at its ends to said pointer and said frame respectively.

4. In a device of the character described, a casing, a thermostat mounted in said casing, a movable frame mounted in said casing, a weight pivoted on said frame and controlled by said thermostat, an actuating dog carried by said weight, a shaft mounted adjacent said weight, a gear mounted on said shaft, and adapted to be actuated by said dog, a ratchet wheel operatively connected to said shaft, and a bell adapted to be actuated thereby.

5. A device constructed in accordance with claim 4 wherein a pivoted lever is connected to said weight and said actuating dog is carried by said pivoted lever.

6. A device constructed in accordance with claim 4 wherein a dial is provided on said casing and a pointer is arranged over said dial, said pointer being connected to said frame to adjust said frame when said pointer is moved.

7. In a device of the character described, a casing, a thermostat mounted in said casing, a movable frame mounted in said casing, a pair of weights pivotally mounted on said frame, catches carried by said thermostat and engaging said weights, one of said catches being longer than the other whereby a greater raise in temperature is necessary to release the weight connected therewith, and a signal adapted to be operated by the release of either of said weights.

8. In a device of the character described, a casing, a thermostat mounted in said casing, a movable frame mounted in said casing, a pair of weights pivotally mounted on said frame, catches carried by said thermostat and engaging said weights, said catches being so arranged that one of said weights will be released at a lower temperature than the other one, and a signal adapted to be operated by the release of either of said weights.

In testimony whereof, I affix my signature.

RICHARD S. JOHNSON.